United States Patent Office 3,506,593
Patented Apr. 14, 1970

3,506,593
STABILIZED ZEOLITE COMPOSITION AND PROCESS FOR PREPARING SAME
Charles R. Allenbach, Williamsville, N.Y., and Francis M. O'Connor, Akron, Ohio, assignors to Union Carbide Corporation, a corporation of New York
No Drawing. Filed Feb. 5, 1968, Ser. No. 702,803
Int. Cl. B01j *11/40;* C01b *33/28*
U.S. Cl. 252—455                    5 Claims

ABSTRACT OF THE DISCLOSURE

A novel zeolitic molecular sieve is provided having the crystalline structure of zeolite A and being highly stable toward structural degradation and pore closure under commercially encountered hydrothermal abuse in adsorption processes, said zeolite being prepared from sodium zeolite A by a controlled exchange of a portion of the sodium cation for potassium cations and at least one species of alkaline earth cation followed by steaming to accomplish a finite degree of pore closure.

---

In adsorption processes, especially those such as dryings in which water is the principal substance to be removed from a fluid hydrocarbon stream, zeolite A in one or more of its permissible cation forms has found wide acceptance in the industry. Basically zeolite A is well suited to this application because its relative ease of preparation results in low initial cost and its small pore size and large internal cavity space provide a substantial degree of selectivity and capacity for adsorbing water. As the need for integrated hydrocarbon conversion and separation processes of greater efficiency has developed, however, there has also developed a commensurate need for a molecular sieve adsorbent which is more selective in its adsorbent properties and more stable against the hydrothermal abuses encountered in sorption-desorption cycling and periodic bed regeneration. An example of such hydrothermal abuse occurs typically with conventional zeolite $K_2A$ adsorbents during the hot purge regeneration of a molecular sieve bed when the water desorbed by such hot purge gas, form a hot liquid zone in contact with the adsorbent. The pH of the water in such a zone can also be quite low, giving rise to an environment well known to degrade the crystal structure of a zeolitic molecular sieve.

Further, for reasons not yet fully understood, water at elevated temperatures is known to cause the phenomenon known as pore closure which in the initial stages adversely affects the sorption rate and ultimately results in a change in the pore size of the molecular sieve.

Accordingly it is the general object of the present invention to provide a novel form of zeolite A which is highly selective in its adsorption properties and is substantially more stable toward structural and sorptive property changes during use in a drying operation.

It is another general object to provide a process for preparing the novel zeolite of this invention.

Other more specific objects will be readily apparent from the specification and appended claims appearing hereinafter.

The novel zeolite of this invention is a crystalline synthetic material having the composition expressed in terms of molar ratios of oxides as follows:

$$[aK_2O + bMO + cNa_2O]:Al_2O_3:1.85 \pm 0.5\ SiO_2:yH_2O$$

wherein $a$ has a value of from about 0.3 to 0.45; $b$ has a value of from about 0.2 to 0.35; the sum of $a+b+c$ equals $1.0 \pm 0.2$; M is at least one species of divalent cation of the alkaline earth group of metals having an atomic number less than 126, i.e., calcium, strontium and magnesium; and $y$ has a value of from about zero to about 6; the atoms of said material being arranged in a unit cell in a manner that the X-ray powder diffraction pattern is that which characterizes zeolite A (identified in detail hereinafter); said material in its activated, i.e., substantially anhydrous state, being capable of adsorbing not more than about 2.5 weight percent $CO_2$ over a period of 1.5 hours at 25° C. and a pressure of $CO_2$ of 250 mm. Hg. When the aforesaid criteria are met the zeolite of this invention will effectively exclude acetylene from the internal cavities In the preparation of the novel zeolites of this invention, one advantageously employs as the starting material the sodium form of zeolite A as described in U.S. Patent No. 2,882,243 issued Apr. 14, 1959 to Robert M. Milton. In the Milton patent, incorporated herein by reference in its entirety, the sodium form of zeolite A is defined compositionally in terms of molar ratios of oxides as $$1.0 \pm 0.2\ Na_2O:Al_2O_3:1.85 \pm 0.5\ SiO_2:YH_2O$$

wherein Y has a value from zero to about 6 and having an X-ray powder diffraction pattern essentially as shown in the following table:

TABLE A

$d$ value of reflection in A.

12.2±0.2
8.6±0.2
7.05±0.15
4.07±0.08
3.68±0.07
3.68±0.06
3.26±0.05
2.73±0.05
2.60±0.05

This is the same pattern which characterizes the zeolites of this invention since they are of the zeolite A type, or more exactly, they are particular and unique species of zeolite A.

Using sodium zeolite A as the starting material, the replacement of the required proportion of the sodium ions by ions of potassium and one or more of calcium, magnesium and strontium can conveniently be accomplished by conventional ion exchange techniques such as immersing the sodium zeolite A crystals in an aqueous solution of salts of the respective metals. The zeolite can be contacted with a solution of one metal salt at a time or a solution of mixed salts of potassium and the desired alkaline earth metal or metals can be employed. The salts of calcium, magnesium and strontium preferred are the halides, especially the chlorides, and nitrates. Strontium nitrate is the preferred salt of strontium for ion exchange purposes. The potassium salts are generally much more soluble than those of the alkaline earth metals and thus include the sulfate and hydroxide as well as the nitrate the chloride. The aforementioned salts are by no means the only suitable materials and many other salts of these metals normally used in ion exchange procedures are well known to those skilled in the art. When solutions of mixed metal salts are employed, however, care should be taken to ensure that one or more of the metal ions is not effectively lost by precipitation as an insoluble salt.

The only critical factor involved in the ion exchange procedure is that the duration of treatment and the salt concentrations are selected so that the cation content, in terms of per mole of $Al_2O_3$, of the final product is from 0.3 to 0.45 equivalent percent potassium, 0.20–0.35 equivalent percent calcium or strontium or magnesium or any combination thereof, with the remainder being sodium cations. It is conceivable that since aqueous solutions of the salts are employed a small percentage of the sodium ions are replaced by hydrogen, but if such is the case, it is found to have no appreciable effect upon the properties of the zeolite product.

The zeolite of required chemical composition having been thus attained, it is an essential step that the zeolite crystals be contacted with water vapor at an elevated temperature for a time sufficient to reduce its absorptive capacity for $CO_2$ to less than about 2.5 weight percent when subjected in an activated state to $CO_2$ at a $CO_2$ pressure of 250 mm. Hg at 25° C. for 1.5 hours.

The temperature of the water vapor (steam) and the time of contact between the water and the zeolite depend in large measure on such factors as the crystal size of the zeolite product, the quantity of zeolite charge, and the effectiveness of the contact. Uusually temperatures of from about 500° C. to 600° C. are employed over a period of about 20 to 30 minutes when treating loose (unagglomerated) zeolite crystals under 0.25 to 0.75 atmosphere of steam. The essential steaming, however, can be achieved in other ways such as firing clay-bonded agglomerates of the zeolite crystals, in which case the hydrous nature of the clay and any adsorbed water in the zeolite is sufficient to cause the requisite pore closure. Such firing is usually done in a furnace in an air atmosphere at about 600° C. In any case, an unduly rapid loss of water with attendant inadequate contact time of water with zeolite should be avoided. For any given physical state and composition of zeolite agglomerate, one skilled in the art can readily determine by simple periodic measurement when sufficient pore closure has been attained.

The final product of the foregoing process will adsorb essentially no acetylene and yet the equivalent potassium cation content is much less than is required in a conventional potassium-exchanged sodium zeolite A to achieve a pore diameter sufficiently small to exclude acetylene. In addition the crystalline structure is remarkably stable toward hydrothermal degradation and the selectivity and capacity for adsorbing water is as great as for a conventional zeolite $K_2A$.

The nature of the novel zeolite of this invention and illustrations of the method of its preparation are provided by the following examples.

EXAMPLE 1

Sodium zeolite A was prepared by the following procedure: Solution "A" was made up initially from 400 ml. of distilled water, 160 grams of reagent grade sodium hydroxide (NaOH) and 156 grams of reagent grade $Al(OH)_3$. After heating and agitation to dissolve the solids, the solution was made up to a volume of 1000 ml. with distilled water. Solution "B" was made up initially from 1500 ml. of distilled water, 80 grams of reagent grade sodium hydroxide and 150 grams of reagent grade silicic acid. After stirring to dissolve the solids, the solution was made up to a volume of 2000 ml. with distilled water. Solutions "A" and "B" were then combined with mixing for one minute. The overall reactant composition of the resultant mixture was, in terms of mole ratios of oxides, $$Na_2O/SiO_2 = 1.44$$

$$SiO_2/Al_2O_3 = 2.2$$

$$H_2O/Na_2O = 53$$

The above mixture was heated for 16 hours at 90° C. The reaction magma was then filtered to recover the crystals from the mother liquor. After washing and drying, samples of product were taken for X-ray, chemical, and adsorption analyses. The X-ray spectrometer pattern showed that the product was virtually 100% sodium zeolite A. The chemical analysis was as follows:

$$0.99\ Na_2O \cdot Al_2O_3 \cdot 2.0\ SiO_2 \cdot 3.1\ H_2O.$$

The $CO_2$ adsorption at 250 mm. Hg and 25° C. was 17.3 wt. percent.

EXAMPLE 2

Approximately 91 grams (dry weight) of the sodium zeolite A of Example 1 was added to a salt solution of 45 grams KCl and 9 grams $CaCl_2$ dissolved in 490 ml. water. The zeolite was allowed to remain in the solution for 30 minutes at 25° C. and was then separated by filtration and washed with water until the washings were free of chloride ion. The $CaO/Al_2O_3$ molar ratio of the product was found to be 0.24, the $K_2O/Al_2O_3$ molar ratio was 0.37, and the $Na_2O/Al_2O_3$ molar ratio was 0.37.

EXAMPLE 3

Approximately 40 grams of the ion-exchanged product of Example 2 were admixed with 10 grams Avery clay and 0.75% of a lignosulfonate. Pellets were formed by extrusion from the blended zeolite-clay mixture. These pellets were fired at 550° C. to 600° C. for about 40 minutes. Half of the pellets were steamed for 2 hours at 550° C. using approximately 0.2 lb. steam/hr. and then the adsorption capacity for pellets of each group for water and carbon dioxide were determined. The results are as follows:

| | Adsorption capacity, g./100 g. | |
|---|---|---|
| | $CO_2$, 250 mm. Hg, 90 min., 25° C. | $H_2O$, 4.6 mm. Hg, 2 hrs., 25° C. |
| Sample A (steamed during firing only) | 2.2 | 19.5 |
| Sample B (steamed additionally) | 0.4 | 17 |

As can readily be observed the agglomerate steamed by firing of the agglomerate only was capable of adsorbing 2.2 wt. percent $CO_2$ which establishes that the zeolite safely excludes acetylene. The additionally steamed zeolite could adsorb essentially no acetylene. When samples of the same zeolite crystals as used in the pellets tested above were steamed under the same conditions (i.e., 550° C. for 2 hours using 0.2 lb. steam/hr.) the activated steamed product was found to adsorb no $CO_2$ and 21.2 g. $H_2O/100$ grams zeolite. The unsteamed crystals in the same state of activation adsorbed 3.8 g. $CO_2/100$ grams zeolite and 22.4 g. $H_2O/100$ grams zeolite.

EXAMPLE 4

Using the same zeolite as in Example 1, calcium and potassium cations were exchanged for some of the sodium ion such that the final product has a $Na_2O/Al_2O_3$ ratio of 0.33. One portion of the zeolite powder steamed at 500° C. for 2 hours using 0.2 lb. steam/hr. was found after activation, to adsorb 0.2 g. $CO_2/100$ grams zeolite and 21.3 g. $H_2O/100$ grams zeolite. By comparison, an unsteamed portion, after activation, adsorbed 5.7 g. $CO_2/100$ grams zeolite and 23.4 g. $H_2O/100$ grams zeolite. Samples of a magnesium and potassium ion-exchanged zeolite A having a $MgO/Al_2O_3$ ratio of 0.27, a $K_2O/Al_2O_3$ ratio of 0.36, and a $Na_2O/Al_2O_3$ ratio of 0.35 were found to exhibit essentially the same properties respecting $CO_2$ and $H_2O$ adsorption as did the calcium and potassium ion-exchanged sample of this example in the steamed and unsteamed state, respectively. Similar results were obtained when the magnesium cation content of the zeolite was replaced by strontium cations.

The zeolites of this invention are particularly useful in drying cracked hydrocarbon gas streams such as those which contain in addition to water, acetylene, ethylene, propylene, and other unsaturated hydrocarbons such as butadiene.

What is claimed is:

1. A synthetic crystalline zeolitic molecular sieve having a composition expressed in terms of molar ratios of oxides as follows:

$$[aK_2O + bMO + cNa_2O]: Al_2O_3 : 1.85 \pm 0.5\ SiO_2 : yH_2O$$

wherein $a$ has a value of from about 0.3 to 0.45; $b$ has a value of from about 0.2 to 0.35; the sum of $a+b+c$ equals $1.0 \pm 0.2$; M is at least one species of divalent alkaline earth metal having an atomic number less than 126; and $y$ has a value of from zero to 6; said zeolite having the crystal structure of zeolite A and in its activated state being capable of adsorbing not more than 2.5 weight-percent $CO_2$ of a period of 1.5 hours at 25° C. and at a $CO_2$ pressure of 250 mm. Hg.

2. The zeolite of claim 1 wherein M represents calcium.

3. The zeolite of claim 1 wherein M represents strontium.

4. The zeolite of claim 1 wherein M represents magnesium.

5. Process for preparing the zeolite of claim 1 which comprises contacting zeolite A having a cation content such that the molar ratio of $MO/Al_2O_3$ is from about 0.2 to 0.35, the molar ratio of $K_2O/Al_2O_3$ is from about 0.3 to 0.45, the remaining cations essentially being sodium, with steam at a temperature of at least about 400° C. for a time sufficient to reduce the adsorption capacity of said zeolite in the activated state from its initial value of greater than 2.5 grams $CO_2$ per 100 grams zeolite to a value less than 2.5 grams $CO_2$ on the same basis, said adsorption capacity being measured at a $CO_2$ pressure of 250 mm. Hg at 25° C. for a period of 1.5 hours.

References Cited

UNITED STATES PATENTS

| | | | |
|---|---|---|---|
| 2,983,670 | 5/1961 | Sewbold, Jr. | 252—455 X |
| 2,988,577 | 6/1961 | Sensel | 23—112 X |
| 3,193,493 | 7/1965 | Bourquet et al. | 23—113 X |
| 3,224,167 | 12/1965 | Jones | 23—113 X |

DANIEL E. WYMAN, Primary Examiner

C. F. DEES, Assistant Examiner

U.S. Cl. X.R.

23—113